H. H. SPECK.
CAMERA.
APPLICATION FILED FEB. 24, 1915. RENEWED OCT. 8, 1919.
1,326,699.
Patented Dec. 30, 1919.
2 SHEETS—SHEET 2.
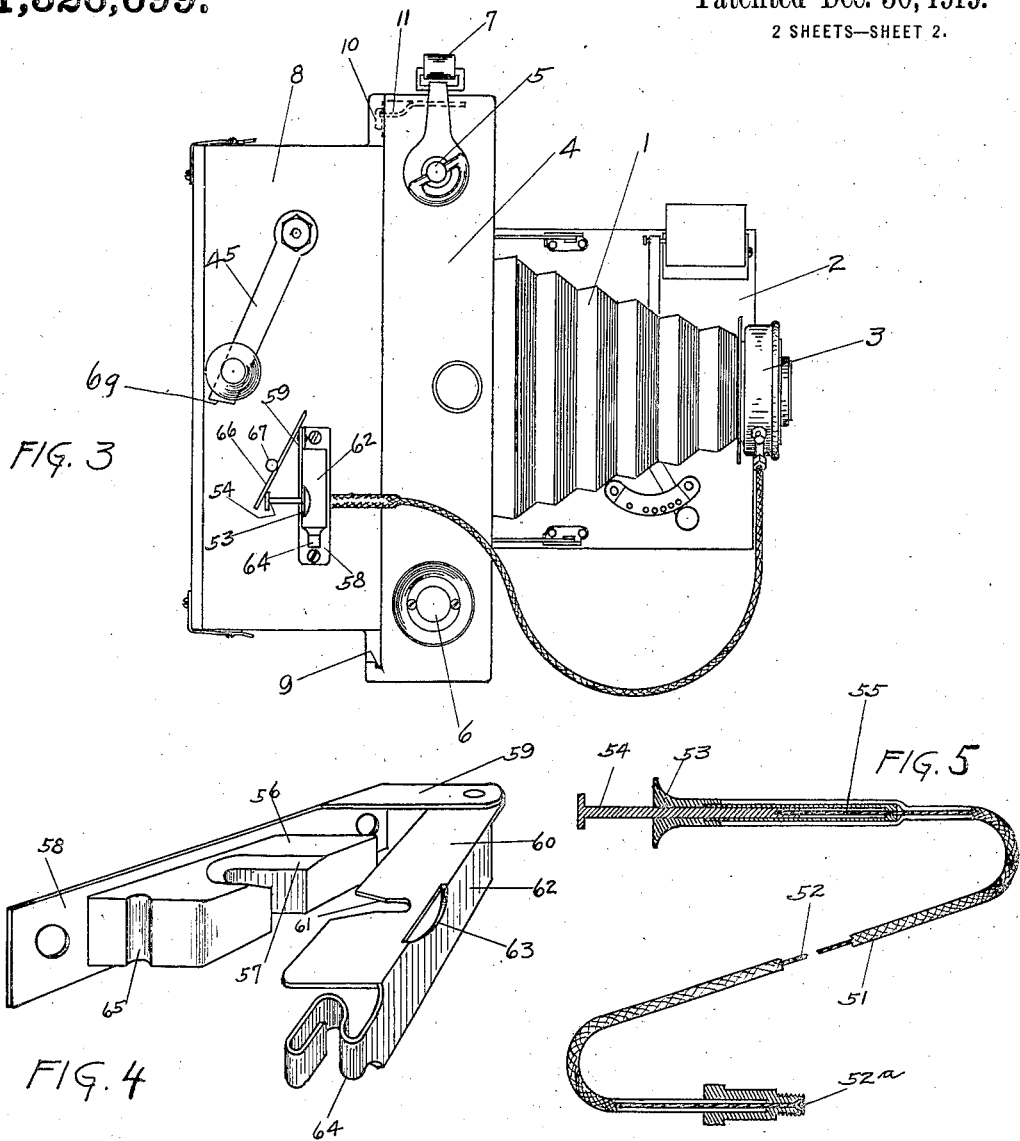
Witnesses
Inventor
Herman H. Speck
by Allen & Allen
Attorneys

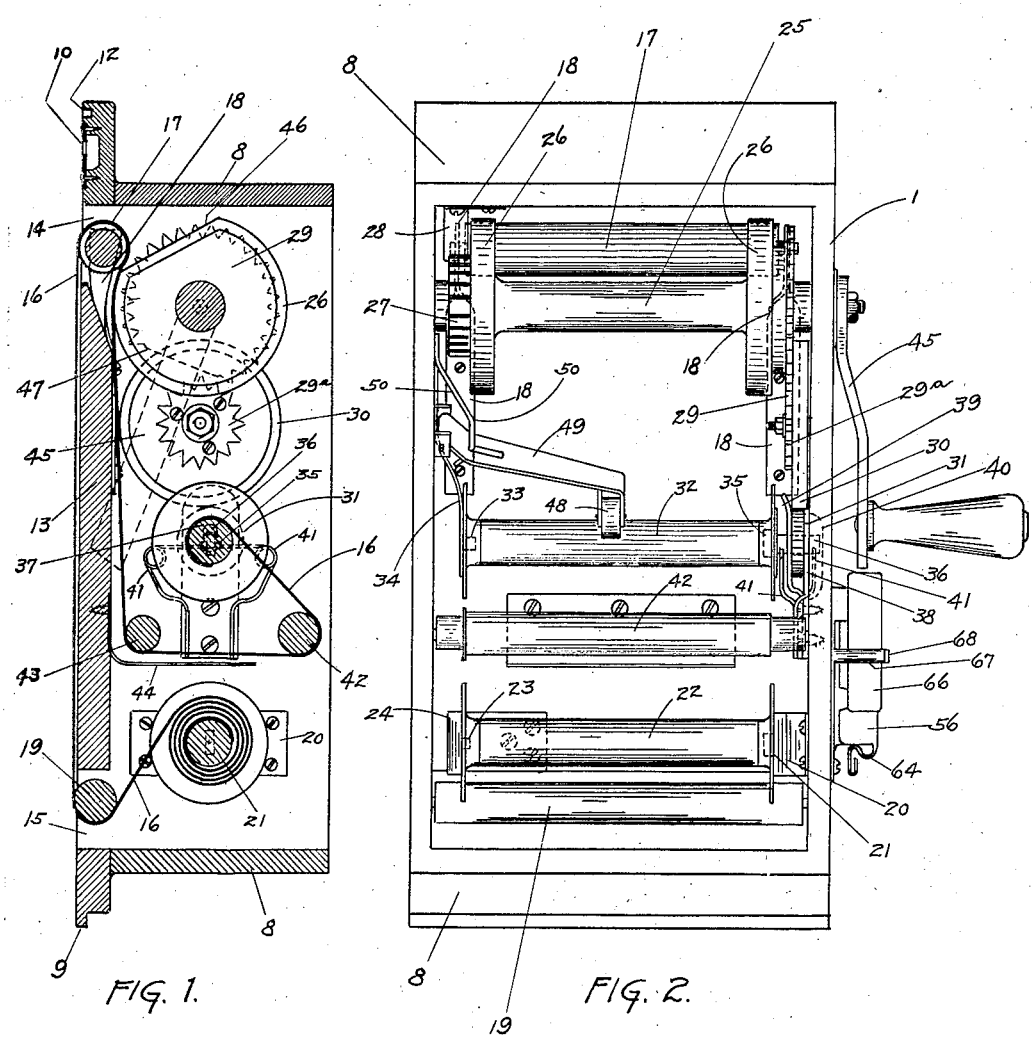

UNITED STATES PATENT OFFICE.

HERMAN H. SPECK, OF CINCINNATI, OHIO.

CAMERA.

1,326,699.  Specification of Letters Patent.  Patented Dec. 30, 1919.

Application filed February 24, 1915, Serial No. 10,327. Renewed October 8, 1919. Serial No. 329,413.

*To all whom it may concern:*

Be it known that I, HERMAN H. SPECK, a citizen of the United States, and a resident of the city of Cincinnati, in the county of Hamilton and State of Ohio, have invented certain new and useful Improvements in Cameras, of which the following is a full, clear, and exact description, reference being had to the accompanying drawings, forming part of this specification.

My invention relates to film cameras wherein a roll of sensitized film is led behind a lens and shutter and wound from one roll to another so as to bring a section of given dimensions into position for exposure, for each photograph that is to be taken.

It is the object of my invention to provide a device for drawing the film from the storage roll onto the receiving roll of a film camera, whereby a turn of a crank accomplishes one complete movement of a given section of film, and whereby in addition a snap shot exposure of the film section is made.

This object, with the advantages noted, and various others as will be detailed below, I accomplish by that certain construction and arrangement of parts to be hereinafter more specifically pointed out and claimed.

In the drawings,

Figure 1 is a central vertical section of the device taken looking toward the film winding crank.

Fig. 2 is a rear elevation of my new device.

Fig. 3 is a side elevation of the camera with my attachment mounted thereon.

Fig. 4 is a perspective view of the bracket for the shutter releasing device.

Fig. 5 is a longitudinal section of the shutter releasing device with the flexible portion thereof in elevation.

My device is shown as attached to a camera having a bellows 1, a door 2, a shutter and lens holder 3, and a box portion 4. This box portion is of the usual type for use with films, and has spindles for the usual storage and receiving film-rolls, at 5 and 6, and a handle 7. The ordinary film attachments are not used when my attachment is mounted on the box, and the new device is shown as attached in the manner of the film pack adapter of the camera art of today. The new attachment is mounted in a box 8, which has a tongue 9 at the lower end to insert in a slot in the camera box, and a latch slot 10 to engage a spring latch finger 11 at the upper end of the camera box. The side of the box facing the camera box is grooved as at 12 (Fig. 1) to fit over a flange (not shown) formed around the back of the camera box which is open, and has a back closure (not shown) for use when the new attachment is removed.

Across the inner side 13 of the attachment box are cut the slots 14 and 15 for the passage of the film 16. In the upper slot 14 is mounted the corrugated feed idler roller 17 on metal plates 18, 18, screwed to the back of the side 13. These plates have sufficient spring in them to yieldably hold the corrugated roller against the feeding disks to be hereinafter described. In the lower slot is mounted the idler roller 19, in any desired manner, as it need not be yieldable.

On a fixed plate 20 near the lower slot and inside of the box is rotatably secured a wing-headed screw 21, the head of which engages a slot in the end of the film storage roll 22, and the other end of the said roll engages a stud 23 on a spring plate 24 secured to the back of the side 13 of the box. The film roll, or storage roll is mounted at this point in loading the camera, and the feeding devices draw the film from this roll forwardly over the idler 19, up along the flat surface of the box side, and thence to the receiving roll.

Mounted on a spindle 25 adjacent the corrugated feed roll above mentioned, are a pair of friction disks 26 which bear against said roll. Secured to the left hand disk is a ratchet wheel 27 which is engaged by a spring finger 28 mounted on the box wall. This ratchet device enforces a clockwise rotation of the friction disks and their spindle. To the other friction disk is secured a gear wheel 29 which meshes with an idler gear 29ª mounted on the box. This latter gear has secured to it a friction wheel 30 which contacts with a friction wheel 31 operatively connected to the receiving roll as will be described.

The receiving roll 32 is mounted at one end by its engagement over a stud 33 on a spring plate 34 mounted on the box. The other end of the roll engages over the wing head 35 of a pin 36. This pin carries the friction disk 31 heretofore mentioned and lies in slots 37 in a pair of plates 38, 39. The plate 38 is the inner plate and extends out over a cored-out portion 40 of the side of the box. The plate 39 is bent inwardly at its outer end so as to extend out over the friction wheel 30 and serve as a guard therefor. The slots in the plates referred to extend at a slight angle from the vertical in the direction of the friction disk 30 and serve to press the small friction disk 31 on the pin 36, that is now being described, against this friction disk 30, in such a way that the contact is a yieldable one. The springs 41, 41, are provided, which press against the pin 36 along the side of each of the plates. The angle direction of the slots is such as to lie directly in line with the pull of the film as it is wound on the receiving roll.

Idler rolls 42, 43 are mounted between the sides of the box, and a guard plate 44 is secured to the side 13 of the box and extends up along these idlers. The film passes over these idlers and without the guard plate might belly-out and become caught in the storage roll, which is immediately below it.

The crank and handle 45 is connected to the spindle of the main friction disks 26 and is employed to turn the receiving roll and the various feeding devices through the medium of the friction disks and gears referred to. It is necessary in any film camera to draw a given amount of film by the position for exposure for each photograph taken, and accordingly the parts herein are so proportioned that one turn of the crank 45 will effect one complete movement of the film for one picture. This is done, however, with due provision for a certain amount of free movement of the spindle 25 to which the crank is connected, so that the operator may tell by the free movement that the crank has completed one complete turn, and to allow him some space within which to stop the movement after each turn which will not feed the film. For this purpose the friction disks 26 have the flattened portion 46, which will pass the corrugated roller 17 without touching it, and the gear 29 is provided with a flat portion 47, free of teeth, which will pass the gear 29ª without meshing with it, and these flattened portions occur so that the gear and friction disks go out of and into mesh at the same time.

The film is wound off of the storage roll around the idler 19 in front of the side 13 of the box, and positively fed between the corrugated roll 17 and the friction disks 26. From these it passes along the side wall of the box, over the idlers 42 and 43, and is positively wound up on the receiving roll. A turning of the crank operates the friction disks 26 and the receiving roll 22, thereby accomplishing the positive movements referred to.

It will be noted that yieldable contact is provided for all friction transmission members. This insures that the film will not get caught or clogged at any point and that the movement will be free and sure. A roller 48 mounted on a hinged arm 49, is maintained against the surface of the receiving roll by means of a spring 50. The film winding devices now described are of value in themselves without the other parts of my machine, inasmuch as they provide a quick and easy way of changing the film after each exposure.

It is desired to have some directions printed on the side of the box, under the crank, to indicate the point where a complete movement of the film for one exposure is accomplished. These are not shown, but it will be understood that any desired word can be stamped or otherwise formed on the side of the box at the point where the handle is to stop after each movement.

As was stated above, the crank 45 is also used to release the shutter of the camera. This is accomplished by the crank while it is idle as far as the film winding rolls are concerned. The flattened portions mentioned are so arranged that when the crank is about to set off the shutter to expose a portion of film, the crank has just come to idle position, and that after setting off the shutter there will still be a certain amount of free movement left, to serve as an element of safety.

The so-called antinous shutter release is preferably used by me, as its structure easily adapts itself to actuation by the crank. Such a release (Fig. 5) has a flexible tube 51 within which is a wire 52. This wire extends out through a union coupling for the shutter box and has a small plunger 52ª at its end to release the shutter. The bell-shaped end piece 53 at the other end of the tube is ordinarily used for a finger hold in the operation of the release, and a plunger 54 connected to the wire is employed to push the wire along within the tube, thereby forcing out the small plunger at the other end. A spring 55 mounted in the end piece 53 serves to maintain the plunger 54 in an extended position, normally.

The bracket 56, having the beveled slot 57 to fit this bell-shaped end referred to, is mounted on the outside of the attachment box, by means of a base plate 58. This base plate has an ear 59 to which is hinged the clamping finger 60. This finger has a slot 61 which will fit down over the shaft of the plunger 54, a top flange 62 (Fig. 4) which has a segmental cut 63 in it to clear the upper edge of the bell-shaped end piece as it stands in the bracket, and a spring latch finger 64 to ride over the end of the bracket plate and engage a slot 65 therein. Mounted pivotally on the attachment box adjacent to the bracket is a swinging plate 66, which is preferably formed with a sleeve 67 that is journaled on a pin 68 inserted in the side of the box. The one end of this plate is in contact with the plunger 54, and is thus held normally with its other end abutting against the ear 59 above mentioned. This latter end of the plate is also in the path of the crank and located so as to contact with it just after the crank has reached idle position as described. The movement of the crank will swing the plate along with it and cause its other end to press in the plunger to release the shutter.

The crank has its end 69 cut slantingly so as to slide over the plate as soon as the shutter is released and the plate will then return to normal position. It will now be evident that by this attachment it will be possible to take an entire film full of pictures in rapid succession. The exposures must of course be "snap shots," and as the operator turns the crank, one limited portion of the film after another will be brought into position for exposure, and exposed. During exposure there will be no turning of the film, because, as explained, the film actuating devices are idle at the position for releasing the camera shutter.

It should be noted that the attachment may be used for other purposes than the mere rapid film exposures mentioned. One film portion at a time may be exposed with long or short intervals of time between exposures as desired. The advantages of easy film turning and the added advantage of the operator always knowing that, if his crank is in a certain position, the film that is in front of the shutter is either exposed or not exposed dependent upon such position, are apparent. As mentioned heretofore, directions may be stamped or pasted on the attachment box to indicate the various position of exposure or nonexposure.

The device as described is shown as operating with a special type of shutter release, but it will be understood that I do not desire to be limited to this one use alone, inasmuch as it is believed to be broadly new to release a shutter in substantially the manner described. References to specific roller mounting and the use of various mechanical expedients of which there are equivalents well known to those skilled in the art, are not intended as limitations of novelty except as stated in the claim.

Having thus described my invention, what I claim as new and desire to secure by Letters Patent, is:—

In an attachment for film cameras, a box, means for mounting a film therein, and mutilated feeding mechanism therein for intermittently feeding the film past an exposure point, a handle for said feeding mechanism exterior the box, a shutter release for the camera located on the outside of the box in the path of the handle, said handle adapted to set off the shutter release by contact therewith during a nonfeeding portion of its movement.

HERMAN H. SPECK.

Witnesses:
 Henry B. Lewis,
 K. Lowther.